United States Patent [19]

Evenzon et al.

[11] Patent Number: 4,991,515

[45] Date of Patent: Feb. 12, 1991

[54] DOUBLE ACTING SWITCH AND METHOD OF USE

[75] Inventors: Vladimir Evenzon, Vernon; Richard Kuchta, Tolland, both of Conn.

[73] Assignee: Gerber Garment Technology, Inc., Tolland, Conn.

[21] Appl. No.: 472,365

[22] Filed: Jan. 30, 1990

[51] Int. Cl.⁵ .................. E01B 25/26; E01B 7/08; B61J 3/00
[52] U.S. Cl. .................... 104/88; 104/102; 246/430
[58] Field of Search ............ 104/98, 102, 130, 88; 246/327, 329, 380, 430

[56] References Cited

U.S. PATENT DOCUMENTS

| | | | |
|---|---|---|---|
| 2,840,006 | 6/1958 | Henderson | 104/102 |
| 3,735,709 | 5/1973 | Matsumoto et al. | 104/130 |
| 4,610,207 | 9/1986 | Uttscheid | 104/256 |
| 4,615,273 | 10/1986 | Osthus et al. | 104/102 |
| 4,884,510 | 12/1989 | Vaida et al. | 104/102 X |

Primary Examiner—Robert J. Oberleitner
Assistant Examiner—Alfred Muratori
Attorney, Agent, or Firm—McCormick, Paulding & Huber

[57] ABSTRACT

A switch is employed in a conveyorized transport system which has a first actuator capable of imparting a first linear movement and a second actuator capable of imparting a second linear movement, which actuators being oriented parallel with one another and are slidably mounted on two guide rods secured to a switch base plate. A bracket carrying a transfer rail section is also supported for movement on the guide rods and is moved between a gap in a first rail and in the entrance end of a subsidiary loop or loops oppositely disposed relative to one another by combined or individual movement of the first and second actuators.

23 Claims, 8 Drawing Sheets

DOUBLE ACTING SWITCH AND METHOD OF USE

CROSS REFERENCE TO RELATED APPLICATIONS

The present application relates to copending U.S. application Ser. No. 362,828 filed on June 6, 1989 in the name of Richard Kuchta and entitled HIGH PERFORMANCE CHAIN FOR AUTOMATED TRANSPORT SYSTEM which application is commonly assigned with the assignee of the present invention.

BACKGROUND OF THE INVENTION

The present invention relates to a switch used in an automated transport system for moving a rail section between positions in line with a main rail or in alignment with an individual or paired subsidiary loops disposed adjacent the main rail, and more particularly relates to an improvement in such an apparatus wherein means are provided for producing it less expensively and for moving the rail section which it carries between its selective positions with enhanced smoothness.

In automated transport systems of the type which this invention is concerned, trolleys carrying work pieces are shuttled between a main rail and subsidiary loops positioned in pairs along the main rail. Such a system is disclosed in U.S. Pat. No. 4,615,273 issued on Oct. 7, 1986 to Osthus et al. and being commonly assigned with the assignee of the present invention. In this patent, a three position transfer sWitch is disclosed for moving a transfer rail between a gap formed in the main rail and the entrance ends of each juxtaposed subsidiary loop positioned on opposite sides of the main rail. However, switches such as these have been found to be quite costly to manufacture. One factor contributing to this cost is the size of the switch frame needed to house the actuator used for powered movement of the transfer rail section. Hitherto, the actuators employed in these switches were elongate units comprised of two actuator assemblies connected end-to-end with one another, which arrangement being considered necessary to achieve movement of the transfer rail between its discrete positions. Also, in these prior art switches, the bracket connecting the transfer rail with the switch was received for movement within guide slots formed in the switch frame, the formation of which slots likeWise added to the manufacturing cost of the switch. Furthermore, the material from which these guide slots could be formed was limited to that material used in the formation of the switch frame. This often resulted in a significant amount of friction being produced by the bracket as it slid within the guide slots in turn causing greater actuator wear thus shortening the useful life of the switch.

Accordingly, it is a principal object of the present invention to provide a switch of compact design for selectively moving a transfer rail section between a plurality of discrete positions in a conveyorized transport system such that its compact size enables smoother and more quiet moving of the transfer rail section between its discrete positions.

The invention further aims to provide a switch of the foregoing character having separately formed guides upon which guides a bracket carrying the transfer rail section is slidably supported.

Another object of the present invention is to provide a switch smoothly moving a bracket carrying a transfer rail section between discrete positions by supporting it for movement on separate guide rods upon which low friction bearings interposed between the guide rods and the bracket bear.

Yet still another object of the present invention is to provide a switch of the foregoing character employing a plurality of actuators slidably mounted for unitary movement on individual guide rods such that the actuators are capable of sliding with the bracket carrying the transfer rail thereby effecting an overall efficiency of movement within the switch.

It is yet another object of the present invention to provide a double acting switch having means for transferring a trolley to an entrance end of a subsidiary loop and for receiving a trolley from an exit point in the subsidiary loop, with the entrance being downstream of the exit point relative to the general direction of trolley movement so that subsidiary loops can be located directly across from one another on a main rail in pairs and a trolley can be transported between subsidiary loops of a given pair or can be recirculated within a single subsidiary loop as desired.

Further objects and advantages of the invention will be apparent from the following description and drawings and from the appended claims.

SUMMARY OF THE INVENTION

The present invention resides in a double acting switch for use in a conveyorized transport system for transferring a trolley between discrete positions corresponding to a position in line with a first rail and an two other positions disposed on opposite sides of the first rail each adjacent a subsidiary loop. The switch comprises a support and a bracket moveable relative to the support and has actuator means interposed therebetween for moving the bracket carrying a transfer rail section between the plurality of discrete positions. For this the actuator means comprises a first actuator and a second actuator with the first actuator imparting a first linear movement to the rail section and the second actuator imparting a second linear movement to the rail section. The first and the second actuators are oriented in a parallel relationship with one another such that either the combined or individual first and second linear movements of the actuators move the rail section between its discrete positions.

The invention further resides in a switch wherein elongate guide rods each secured against movement to a support and upon which rods the bracket and the first and the second actuators slide relative to the switch frame. The bracket and the actuators are mounted with the guide rods on bearings made of low friction material thus enabling the rail section to be moved smoothly between its distinct positions.

The invention further resides in a transfer rail switch of reduced size being configured to house the first and second actuators arranged in a parallel relationship with one another. This arrangement of the actuators in combination with an associated control system produces the improved movement of the rail section between its three discrete positions taken relative to the first rail.

DETAILED DESCRIPTION OF THE PREFERRED EMBODIMENT

Figure 1:
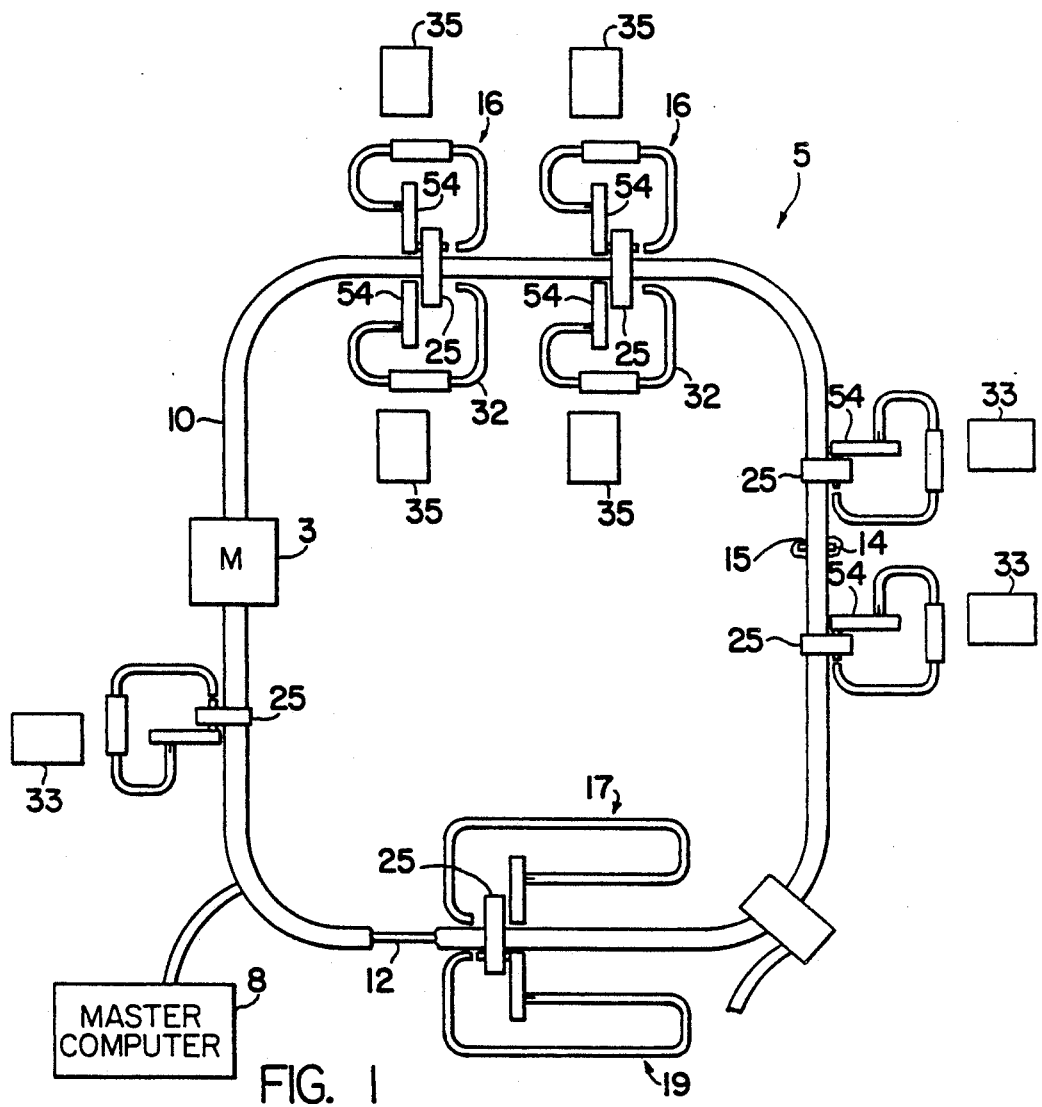
FIG. 1 is a top view of a conveyorized transport system embodying the present invention.

Turning first to FIG. 1, an automated transport system shown generally as 5 employs the invention. The system includes a propulsion track 10 in the form of an extruded channel through which an endless chain having two pushers 15,15 travels under the power from a motorized drive unit 3. Situated beneath the track 10 is a main rail 12 along which freely traveling trolleys 14,14 ride while being propelled by the pushers 15,15. Positioned along the track 10 along either or along both sides, such as in pairs, are subsidiary loops 16,16 and 32,32 leading to and from a workstation 33 or 35 and are subsidiary loops 17 and 19 leading to storage facilities from the track 10. The automated transport system 5 further includes a master computer 8 for controlling the movement of transfer switches 25,25 which route the trolleys between the main rail 12 and each pair of subsidiary loops 32,32 and 16,16 or directly between the adjacently disposed subsidiary loop pairs 32,16 and 32,16 as will hereinafter be discussed in greater detail.

Figure 2:
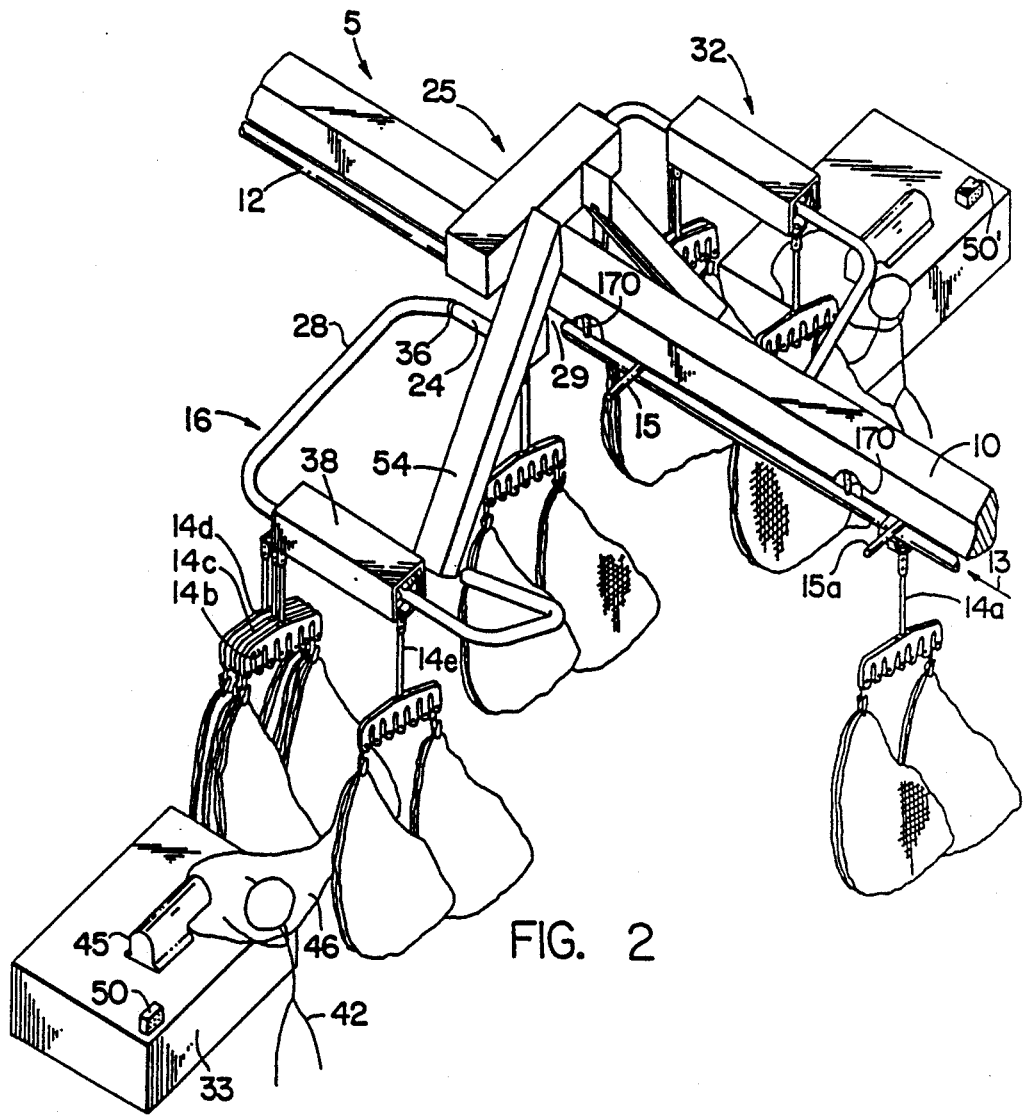
FIG. 2 is a perspective view of a section of the conveyorized transport system of FIG. 1 and includes a stretch of main rail and propulsion track plus two oppositely disposed subsidiary loops, associated workstations and an associated transfer switch.

Referring now to FIG. 2 a section of the automated transport system 5 of FIG. 1 is shown and illustrates the propulsion track 10 situated above the main rail 12 and a pair of subsidiary loops 16 and 32 positioned adjacent one another on opposite sides of the track 10. As shown, a trolley 14A rides on the main rail 12 and is propelled in the illustrated direction shown as 13 by one of the pushers 15 specifically identified as 15a carried in turn by the chain (not shown). Restricting brackets 170 extend downwardly from the endless chain 2 with the pusher 15,15, with each bracket being positioned in front of one of the pushers such that the trolley 14a, as shown in FIG. 2, is moved towards the subsidiary loop 16 under the positive force of an associated pusher.

The subsidiary loop 16 includes looping rail 28, stop 38 and an elevator 54 with the oppositely disposed subsidiary loop 32 being a mirror image of the loop 16. The main rail 12 and each subsidiary loop 16 and 32 have a gap 29 lined up with one another, and the switch 25 includes a straight section of rail 24 and an actuator apparatus as will be hereinafter described in greater detail. The looping rail 28 of subsidiary loop 16 slopes downwardly from its entrance 36 the point where the trolleys are received from the transfer rail section 24 and from which point the trolleys are committed to circulate within the subsidiary loop 16, under the force of gravity. The stop 38 stacks the downwardly traveling trolleys, shown in this case as 14b–d, until an operator 42 is ready for one, at Which time he or she presses a button on control box 50 to open the gate 38 and allow trolley 14b to roll toWard the workstation. The operator performs a work operation, such as seWing with sewing machine 45, on the work piece 46 carried by the involved trolley. When completed, he or she can push another button on the control box 50 to cause a gate 38 to open and allow that trolley to roll toward the elevator 54 where it will await carriage upwardly toward the main rail 12. Once the trolley is carried upwardly to a position adjacent to the main rail 12 by the elevator 54, it is then moved onto the transfer rail 24 Whereupon it may be selectively moved into alignment with the main rail 12, or across it to the opposite subsidiary loop 32 or may even remain adjacent the entrance end of subsidiary loop 16 in order to be recirculated through the same subsidiary loop. For a more complete description of the manner by which a trolley is transferred from the rail section 24 to and between adjacent subsidiary pairs, reference may again be had to the aforementioned U.S. Pat. No. 4,615,273.

Figure 3:
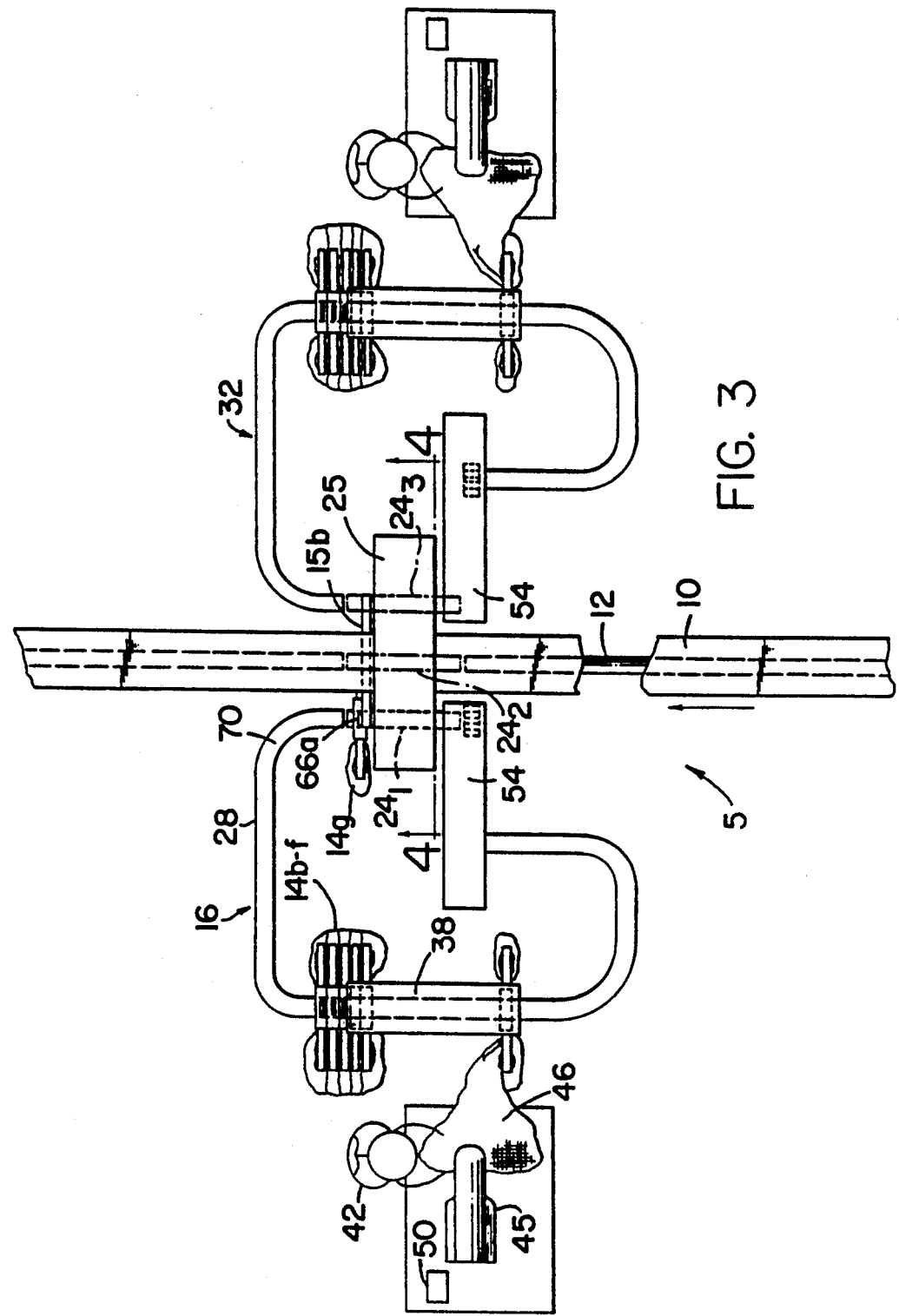
FIG. 3 is a top view of the section of conveyorized transfer system of FIG. 2 and illustrates three positions of the transfer switch.
Figure 4:
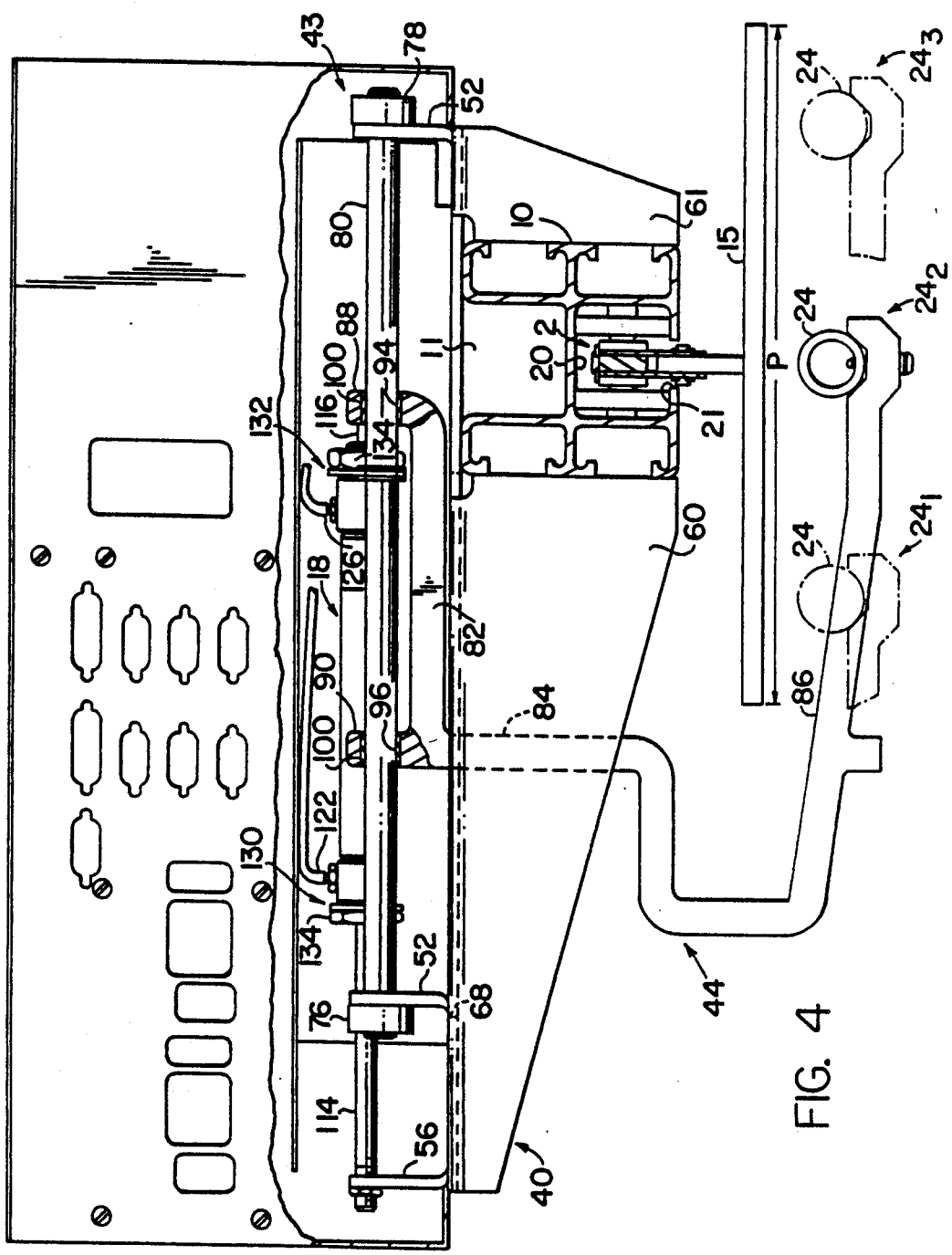
FIG. 4 is a partially fragmenting front view in enlarged scale of the transfer switch as taken along line 4—4 FIG. 3.

Referring now to FIG. 3 for a detailed description of the manner in which the transfer switches 25,25 are employed in the transport system 5, it will be seen that the switches 25,25 are double acting switches capable of moving the transfer rail section 24 between three discrete positions. These are, position $24_1$ in which the rail section 24 is in line with the entrance end of subsidiary loop 16, position $24_2$ wherein the rail section 24 is in alignment with the main rail 12 and position $24_3$ in which the rail section 24 is in line with entrance end of the subsidiary loop 32. Powered engagement by the chain with a trolley between these positions is effected because the chain 2 as shown generally in FIG. 4, travels along the track 10 within a substantially U-shaped elongate recess 20 having a slot 21 through which the pushers 15,15 extend. The length of the pusher 15 represented by the dimension P is such that it extends across to positions $24_1$ and $24_3$ so that positive pushing engagement is maintained by the pusher 15 with a crown portion 66a of the trolley 14g so as to move it along the rail section 24 as the rail section is moved between its discrete positions. Thus, it should be understood that by the time the section 24 arrives at either of the positions $24_1$ or $24_3$, the trolley 14g will be initially pushed onto a first turn 70 of the looping rail 28, and thereafter the crown portion 66a of the trolley will be out of reach of the pusher 15b and the trolley 14g will then move around the looping rail 28 exclusively by gravity.

In accordance with the invention, a transfer switch 25 of improved design and reduced cost is shown in FIGS. 4–7 and is capable of smoothly moving the transfer rail section 24 between selectively distinct positions in line with the main rail 12 or with the adjacently disposed subsidiary loops 16 and 32 located opposite of one another. To this end, the transfer switch 25 is comprised of actuator means 18, a support in the form of a base plate 40, guide means 42 which include rods 80 and 81, and a generally U-shaped bracket 44 mounted for movement on the guide rods and carrying the rail section 24 for movement between positions $24_1$, $24_2$, and $24_3$.

Turning now to the details of the individual elements of the exemplary device, the particular construction of the support base plate 40 as it relates to the functioning of the switch 25 will be considered first. The base plate 40 is generally rectangular having a length L and a width W and is turned downwardly lengthwise along each side on lines extending parallel to the dimension L to create two support flange sets 60,61 and 62 63. The support flanges of each set are separated from one another by a gap 11 creating a yoke securely seating the switch 25 against lateral movement on the track 10. A generally elongate opening 68 is formed in the base plate 40 with its elongate extent extending parallel with dimension L and through which opening 68 a depending portion 84 of the bracket 44 is sized for communication through and below the base plate 40. Extending from the base plate 40 in a direction oppositely of the support flanges are two pairs of tabs 52,52 and 53,53 which hold the guide rods 80 and 81 in position above the base plate 40. Aligned openings 72,72 and 73,73 are formed respectively in each of the tab pairs and through which are received an associated one of the guide rods 80 and 81. The guide rods 80 and 81 are held against relative axial movement on the tabs which support them by collars 76,76 and 78,78 secured to each of the guide rods by a radially disposed set screw.

The general U shape of the bracket 44 is defined by a first transverse portion 82 extending generally parallel to the base plate 40, with the depending portion 84 extending generally downwardly from the first transverse portion 82 and being integrally connected at its lower end to a second transverse portion 86 extending generally parallel to and spaced from the base plate 40 and is fixably connected at its free end to the rail section 24 so as to support it beneath the track 10.

To slidably connect the bracket 44 for relative movement with the guide rods 80 and 81, the bracket has a first flange portion 88 and two separate second flange portions 90,90 spaced apart from the first flange portion 88 by the first transverse portion 82 of the bracket 44. Each of the flange portions 88 and 90,90 extends upwardly from the bracket 44 and respectively have openings 94,94 and 96,96 for receiving the guide rods 80 and 81 therein. Interposed between the inner walls of these openings and the guide rods 80 and 81, are annular slide bearings 100 pressed fit within the openings 94,94 and 96,96 for sliding engagement on the guide rods. The slide bearings 100 have a composite construction comprised of an annular steel backing and a lead overlay forming an inner low friction annular surface. To further this end, the guide rods 80 and 81 are formed from hardened steel coacting with the lead material in the bearings 100 to effect smooth and quiet sliding of the bracket 44 along the guide rods 80 and 81.

Referring now to FIGS. 5-8 for a detailed description of the actuator means 18 and the manner in which they are mounted for sliding movement relative to a base plate 40, it will be seen that the actuator means 18 is comprised of a first actuator 110 and a second actuator 112 each having a housing supported by the base plate 40 and are arranged in a parallel relationship with one another above it. The actuators 110 and 112 are double acting pneumatic actuators each respectively having a moveable piston rod 114 and 116 capable of sliding relative to its associated housing. Each of the piston rods 114 and 116 is prompted between an extended position and a retracted position by controllably introducing pressurized fluid, usually compressed air, respectively into expansion inlets 120,122 and retraction inlets 124,126 each formed in one of the first and second actuators 110 and 112. As will be discussed in greater detail later, these inlets are connected by lines with a pressurized fluid source, with the flow of the pressurized fluid being selectively controlled by a solenoid valve associated with each of the actuators.

The actuators 110 and 112 are oppositely disposed relative to one another on the base plate 40 with the free end of the piston rod 114 of the actuator 110 being secured to an upwardly turned portion 56 of the base plate 40 while the second actuator 112 with its piston rod 116 directed oppositely of the rod 114 and toward the first flange portion 88 of the bracket 44 is connected for movement with it. An opening formed in the upwardly turned portion 56 receives a portion of the piston rod 114 and is held against movement relative to it by suitable securing means, such as a nut engaging with a threaded end portion of the piston rod. Likewise, the end portion of the piston rod 116 may be threaded for connection with a correspondingly threaded opening in the flange portion 88. This arrangement of the actuators 110 and 112 enables the switch 25 to be relatively compact while nevertheless permitting the bracket 44 and consequently the rail section 24 to be selectively moved relative to the stationary main rail 12 by the individual or combined linear movements imparted by the actuators 110 and 112.

To accomplish unitary sliding of the first and second actuators 110 and 112 along the rods 80 and 81, the actuators are held in spatial relationship with one another by two collar plates 130 and 132. These plates each respectively have a pair of spaced apart mounting openings 131,131 and 133,133 respectively receiving threaded neck portions 111 and 113 of the actuators 110 and 112. The collar plates 130 and 132 are clamped against each actuator housing by locknuts 134,134 which threadedly engage on associated ones of the neck portions 111 and 113 of the actuators 110 and 112. By this means, the actuators 110 and 112 are held in a parallel spaced apart relationship with one another.

In the preferred embodiment of the inVention, the collar plate 132 has portions 151 and 153 extending laterally outwardly beyond the actuators 110 and 112 and has openings 138 and 140 respectively formed in these portions through which the guide rods 80 and 81 are received. Interposed between the collar plate 132 and each of the guide rods and within the openings 138 and 140, are sleeves 144,144 formed from a low friction material, preferably NYLON, serving as bearing elements through which movement of the actuators 110 and 112 relative to and on the guide rods 80 and 81 is accomplished. It should be appreciated then that the actuators 110 and 112 being laterally supported by the collar plate 132 on the guide rods 80 and 81 are thus supported against any undesirable twisting which may occur due to the parallel orientation of the actuators.

In operation, the switch 25 is capable of several different modes of operation, with each mode resulting in the positioning of the transfer rail section 24 in one of the discrete positions $24_1$, $24_2$ and $24_3$ shown in FIG. 3. Assuming then that the position taken by the transfer rail in FIG. 5 corresponding to the $24_2$ position will be understood to be normal relative to the other positions which may be taken by the transfer rail section 24, a discussion of the manner and the means by which selective positioning of the transfer rail section 24 is accomplished relative to its normal orientation can now be addressed. To this end, a control system for selectively positioning the rail section 24 is illustrated generally in FIG. 8 and includes the master computer 8, control boxes 50,50′ each respectively associated with one of the workstations and solenoid valves 202 and 204 each of which being respectiVely connected with an associated one of the actuators 110 and 112 for controllably regulating in an ON/Off manner the flow of pressurized fluid into them.

The control boxes 50,50' each include separate controllers 500,501 interfacing with the master computer 8 with each controller respectively including its own central processing unit (CPU) 502,503 directing commands to an associated solenoid driver 504,505 for respectively controlling the "ON" and "OFF" conditions of the solenoid valves 202 and 204. The controllers 500,501 are ones such as disclosed in copending U.S. patent application Ser. No. 407,862 entitled SELECTIVELY POSITIONABLE VARIABLE HEIGHT WORKSTATION AND METHOD OF USE filed on Sept. 15, 1989. in the name of Richard Kuchta et al. and which application being commonly assigned with the assignee of the present invention and being hereby incorporated by reference.

Figure 5:
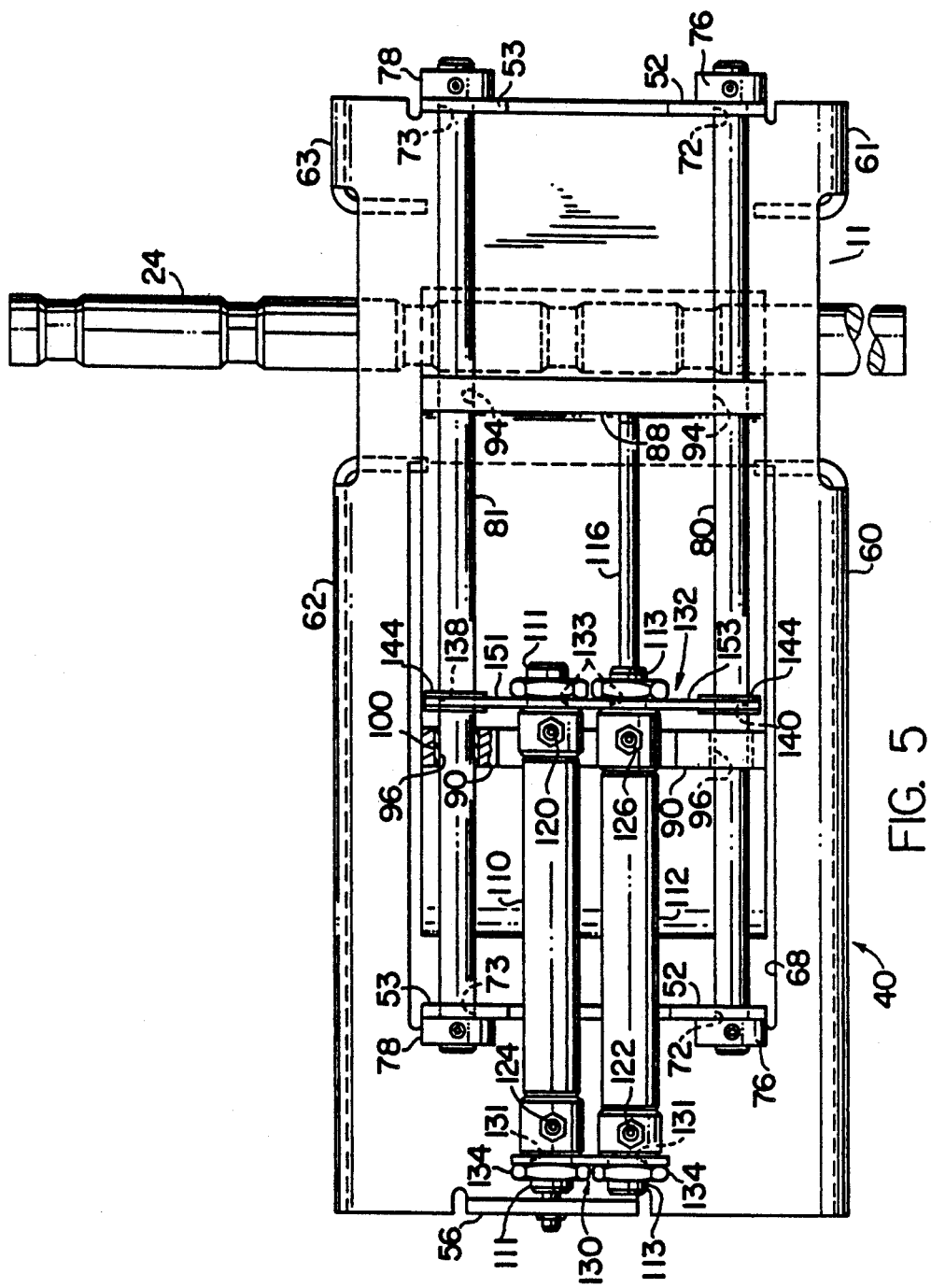
FIG. 5 is a top view of the transfer switch with its cover removed illustrating the transfer rail section in its normal bridging position.
Figure 8:
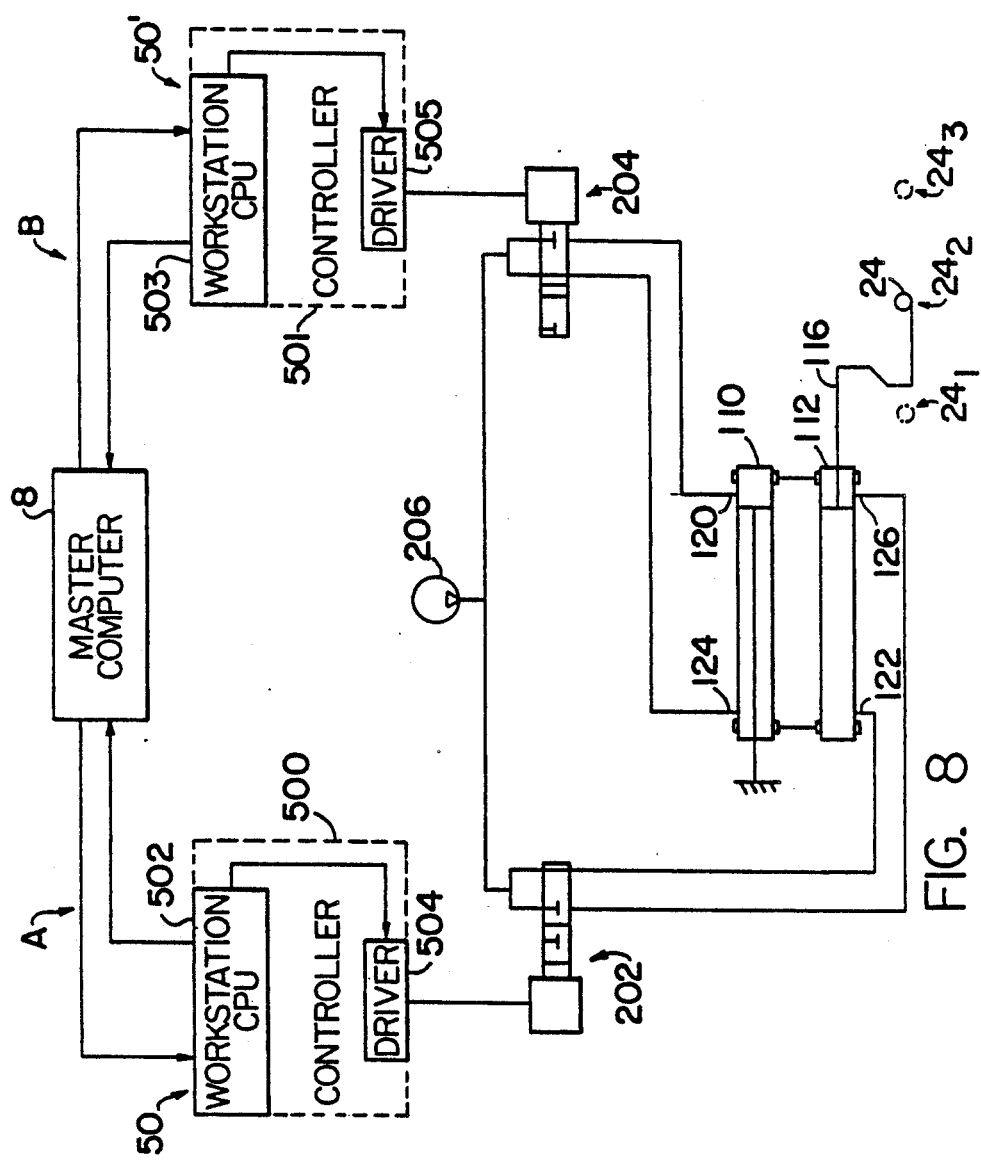
FIG. 8 is a schematic of the control system employed for accomplishing movement of the rail section between the positions illustrated in FIGS. 5–7.

The solenoid valves 202 and 204, as shown in FIG. 8, are normally in an "OFF" condition, in which condition the transfer rail section 24 is located midway along its travel path in the $24_2$ position of FIG. 5. To accomplish this, pressurized fluid is introduced into the expansion inlet 122 of the second actuator 112 and into the retraction inlet 124 of the first actuator 110 such that piston rod 116 is moved to its extended position and piston rod 114 is moved to its retracted position.

Figure 6:
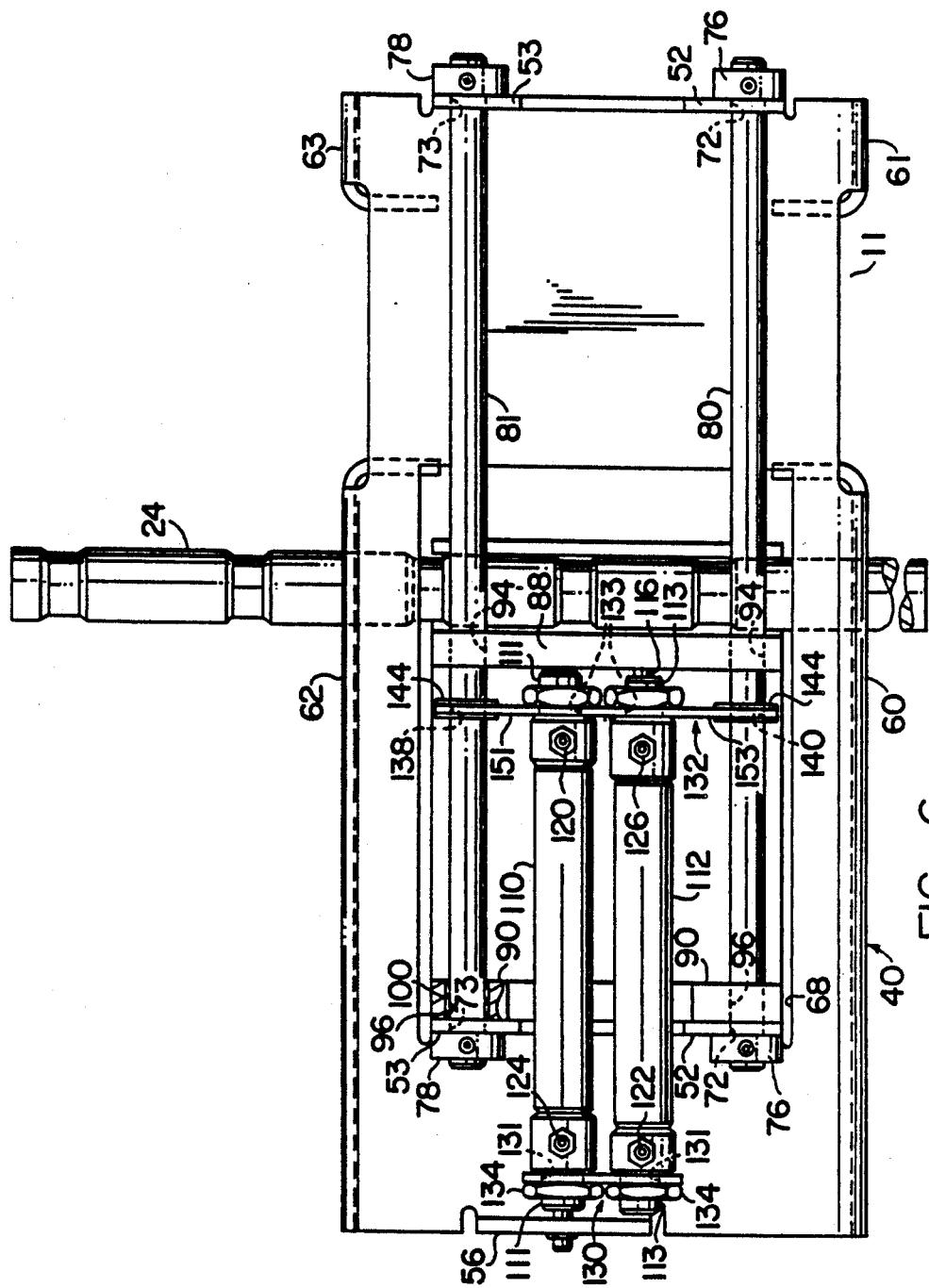
FIG. 6 is a top view of the transfer switch with its cover removed illustrating the transfer rail section in its leftmost position.

From this normal position, a trolley may be transferred from the main rail 12 onto the leftmost subsidiary loop 16 here associated with control box 50 and the $24_1$ position of FIG. 6 by the master computer 8 initiating a command to the workstation controller 500 instructing it to energize the solenoid valve 202 to an "ON" condition. This in turn introduces pressurized fluid into the retraction inlet 126 of the second actuator 112 thus prompting the piston rod 116 to he moved to its retracted position thereby positioning the rail section 24 in its leftmost $24_1$ position at which position the trolley may proceed to enter the subsidiary loop 16. Once the operator 42 completes work on the workpiece carried by the involved trolley, the operator then pushes a "SEND" button on the control box 50 resulting in the controller 500, after receiving instruction from the master computer 8 to do so, de-energizing the solenoid valve 202 and placing it in its "OFF" condition, consequently returning the transfer rail section 24 back to its normal $24_2$ position with the transferred trolley on it.

Figure 7:
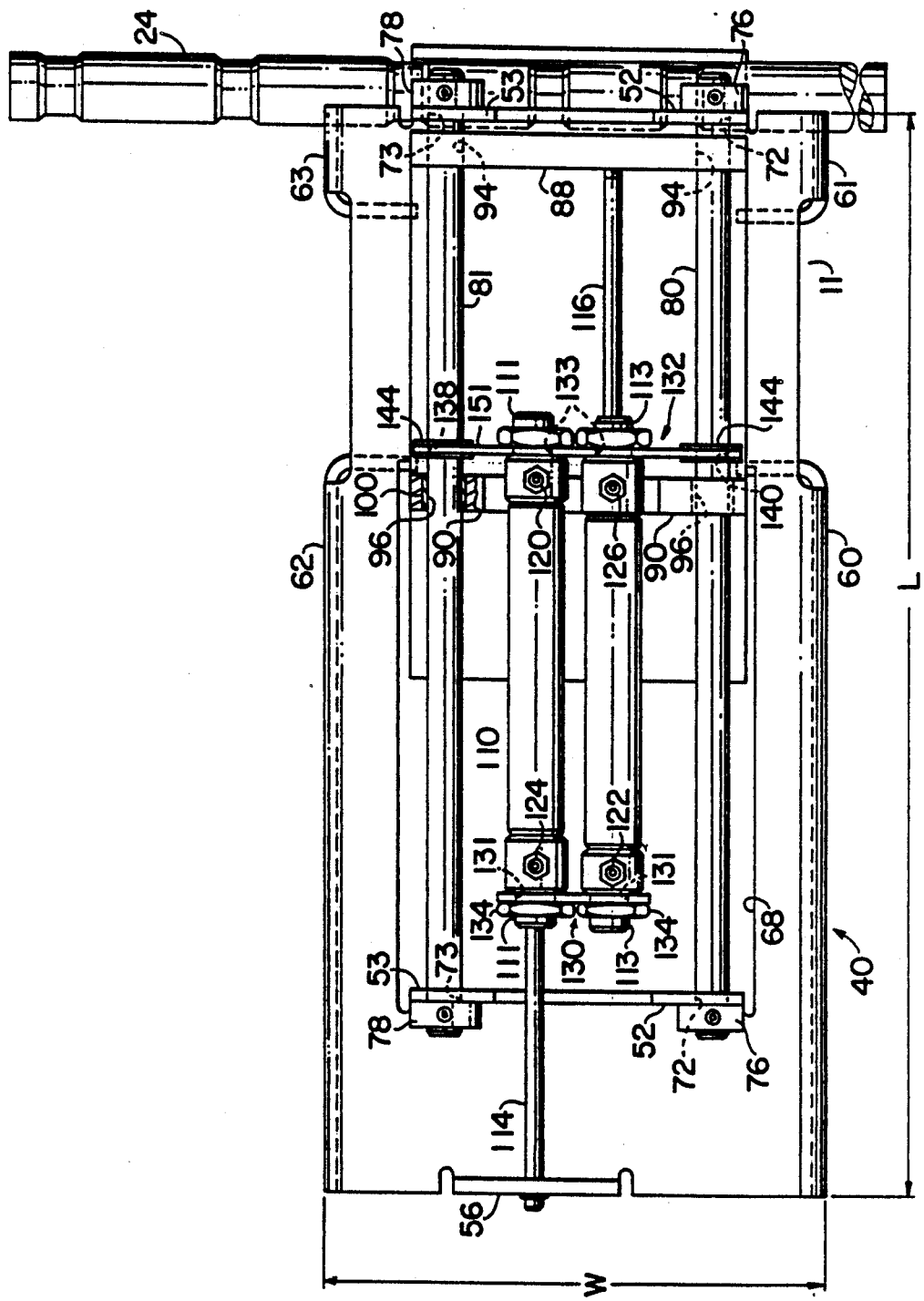
FIG. 7 is a top view of the transfer switch with its cover removed illustrating the transfer rail section in its rightmost position.

In another mode of operation, where it is desired to transfer a trolley from the main rail 12 onto the rightmost subsidiary loop 32, here associated with control box 50' and the $24_3$ position of FIG. 7, the master computer 8 will again initiate a command to the workstation controller 501 instructing it to energize the solenoid valve 204 from its normally "OFF" condition to its "ON" condition. This results in pressurized fluid being introduced into the expansion inlet 120 of the first actuator 110 thereby moving the transfer rail section 24 to its rightmost $24_3$ position. Once the operator 42 completes work on the workpiece carried by the involved trolley, the operator then pushes a "SEND" button on the control box 50' resulting in the controller 501, after receiving instruction from the master computer 8 to do so, de-energizing the solenoid valve 202 placing it in its "OFF" condition, consequently returning the transfer rail section 24 and the trolley carried by it back to the $24_2$ position.

In a third mode of operation, the sWitch 25 is capable of completely moving the transfer rail section 24 from an initial $24_1$ position through to a final $24_3$ position, or vice-versa, in situations where it is necessary to transfer the involved trolley directly between the oppositely disposed subsidiary loops 16 and 32. In such situations, it should be understood that the one of the solenoid valves 202,204 associated with the workstation at which the rail section 24 is initially positioned adjacent to, will be in an "ON" condition while the other valve will be maintained in its normally "OFF" condition. Thus, movement of the rail section 24 directly between positions $24_1$ and $24_3$ may be accomplished by simultaneously reversing the ON/OFF conditions of the solenoid valves 202 and 204 by utilizing the interfacing capability of the master computer 8 to effect such simultaneous instruction to the controllers 500 and 501.

By the foregoing, a switch used in a conveyorized transport system has be%n described in the preferred embodiment of the invention. However, it should he understood that numerous modifications and substitutions may he made without departing from the spirit of the invention. For example the actuators 110 and 112 have been described in the foregoing as being pneumatically powered, however it is not outside of the scope of the present invention to substitute other powered devices, such as electrically powered actuators, for this purpose. In addition, the switch 25 is not limited in its operation by the control scheme shown in FIG. 8, but rather may be connected with other control schemes configured to effect similar results achieved by those controls disclosed herein. Also, it should be understood that the terms rightmost and leftmost as applied to the positions assumed by the rail section 24 have been used for clarity purposes and that these terms should be taken in a relative sense only and are not intended to limit the scope of the invention. Accordingly, the invention has been described by way of illustration rather than limitation.

We claim:

1. A switch for use in a conveyorized transport system for moving a transfer rail section between discrete positions with one of said positions being in line with a main rail and with the remaining positions each being in line with a subsidiary loop entrance end located opposite one another on either side of said main rail, said switch comprising:

a support;

a bracket moveable relative to said support and carrying a transfer rail section for movement between said discrete positions;

first actuator means connected with said support for imparting to said transfer rail a first linear movement;

second actuator means connected with said bracket for imparting to said transfer rail a second linear movement;

guide means mounted to said support for slidably supporting said bracket and said first and second actuator means thereon; and said first and said second actuators being arranged in a parallel spaced apart side-by-side relationship with one another for unitary movement relative to said support such that said first linear movement and said second linear movement either combined or individually effect selective positioning said transfer rail at one of said discrete positions.

2. A switch as defined in claim 1 further characterized in that each of said first and said second actuators have a moveable rod extending outwardly therefrom;

said moveable rod of said first actuator being connected to said support and being disposed in a direction oppositely of said moveable rod associated with said second actuator; and wherein said moveable rod of said second actuator being connected to said bracket.

3. A switch as defined in claim 1 further characterized in that said guide means includes two laterally spaced apart guide rods secured against axial movement on said support; and means formed on said bracket for slidably mounting it with each of said two guide rods.

4. A switch as defined in claim 3 further characterized in that said means for slidably mounting said bracket to said two guide rods includes a first flange portion and two separate second flange portions spaced from said first flange portion by a first transverse portion of said bracket, said first flange portion having two spaced apart openings formed therein and each of said two separate second flange portions having an individual opening formed therein; and each of said openings formed in said first and second flange portions respectively receiving one of said two guide rods therein.

5. A switch as defined in claim 4 further characterized in that a plurality of annular slide bearings are each located within said openings in said first and second flange portions;

said annular slide bearings each being formed in part from a low friction material and being interposed between said first and second flange portions and said guide rods for sliding engagement thereon.

6. A switch as defined in claim 5 further characterized in that each of said annular slide bearings is a two component element having a steel backing and a lead overlay disposed radially inwardly thereof;

said steel backing being pressed fit into each of said openings formed in said first and second flange portions and said lead overlay engaging with an associated one of said guide rods; and wherein said guide rods are formed from a hardened steel material.

7. A switch as defined in claim 4 further characterized in that said support includes a base plate having a length and a width;

said base plate having a generally elongate opening formed in it with the generally elongate extent of said opening being oriented parallel with said base plate length dimension;

each of said guide rods being held in position above said base plate by a pair of tabs extending upwardly of said base plate;

the tabs of each of said pair being disposed oppositely of one another on the opposite sides of said opening; and wherein each tab of each pair having an opening for receiving a respective one of said two guide bars therein.

8. A switch as defined in claim 7 further characterized in that said bracket is generally U-shaped and has a depending portion extending from said first transverse portion through and below said generally elongate opening in said base plate: and wherein said depending portion of said bracket at its lower end being integrally connected with a second transverse portion extending generally parallel with said first transverse portion and having a free end at which end said rail section is secured to said bracket.

9. A switch as defined in claim 7 further characterized in that portions of said base plate along each side extending parallel with said base plate length being turned downwardly of said base plate thereby creating two support flange sets connected with said base plate along each of said sides; and wherein the involved ones of the flanges comprising each support flange set being spaced from one another to form a gap sized for securably receiving a section of track upon which track section said switch is capable of being seated.

10. A switch as defined in claim 3 further characterized in that said first and second actuators are each connected at each opposite end with one another by first an second collar plates, said first collar plate having two portions extending laterally beyond said first and second actuators with each lateral portion having a through opening respectively receiving one of said guide rods.

11. A switch as defined in claim 10 further characterized in that a sleeve is received within each of said openings formed in said lateral portions of said first collar plate; and wherein each of said sleeves being interposed between said first collar plate and one of said two guide rods to slidably support said first and second actuators for movement on said two guide rods.

12. A switch as defined in claim 11 further characterized in that said first and said second actuators each have threaded neck portions disposed at opposite ends thereof;

each of said first and second collar plates having through mounting openings sized for receiving respective ones of said neck portions of said first and said second actuators therein; and wherein said first and said second collar plates being clamped against said first and said second actuators by locking nuts threadedly engaging with respective ones of said neck portions of each of said first and said second actuators.

13. A switch as defined in claim 1 further characterized in that said first actuator has a first inlet and a second inlet and said second actuator has a third inlet and a fourth inlet;

said first inlet of said first actuator and said third inlet of said second actuator respectively communicating with an actuator expansion chamber;

and said second inlet of said first actuator and said fourth inlet of said second actuator respectively communicating with an actuator retraction chamber; and control means for controllably introducing pressurized fluid at selected instances into said first, second third and fourth inlets of said first and said second actuators to effect movement of said rail section between said discrete positions.

14. A switch as defined in claim 13 further characterized in that said control means includes a master computer connected with two interfacing workstation controllers;

each of said two workstation controllers commanding an associated solenoid valve connected for fluid communication with one of said first and second actuators for regulating the flow of pressurized fluid therein;

one of said solenoid valves associated with said two workstation controllers being connected for fluid communication with said first actuator first and said second inlets and the other solenoid valve associated with the other workstation controller being connected for fluid communication with said second actuator third and fourth inlets; and wherein each of said solenoid vales is selectively operable between ON and OFF conditions.

15. A switch as defined in claim 14 further characterized in that said first and second actuator means each include slidable piston rods;

said first actuator piston rod being secured against relative movement to said support and said second actuator piston rod being secured for movement with said bracket; and wherein said first and second actuator piston rods being oriented in opposite directions relative to one another.

16. A switch as defined in claim 14 further characterized in that said solenoid valve associated with said first actuator is normally in an OFF condition in which condition pressurized fluid enters said second inlet of said first actuator and pressurized fluid is prevented from entering said first inlet of said first actuator;

said solenoid valve associated with said second actuator normally being in an OFF condition in which condition pressurized fluid enters said second actuator third inlet and pressurized fluid is prevented from entering into said second actuator fourth inlet; and wherein said OFF condition in both of said solenoid valves results in said transfer rail section being positioned midway along its path of travel in line with said main rail.

17. A switch as defined in claim 16 further characterized in that said transfer rail section is moved away from said midway position toward one of said workstations when the solenoid valve associated with the workstation toward which said transfer rail section is to be moved is placed in an ON condition and said solenoid valve associated with the opposite workstation is maintained in an OFF condition.

18. In a conveyorized transport system of the type having a switch for transferring a trolley between a first rail and two adjacently disposed subsidiary loops, said switch comprising:

a support mounting said switch adjacent said first rial;

a transfer rail section moved by said switch for transferring said trolley between said first rail and each of said subsidiary loops or directly between subsidiary loops;

said first rail and each of said subsidiary loops having a gap for receiving said transfer rail section;

said support including a generally elongate base plate and having a correspondingly elongate opening formed in it;

a generally U-shaped bracket connected with said switch at its upper end and having an intermediate portion extending downwardly through and beyond said opening formed in said base plate and carrying said transfer rail section at its opposite lower end;

guide means secured to said base plate for slidably mounting said U-shaped bracket for movement relative to said base plate;

actuator means for powered moving of said U-shaped bracket relative to said base plate and being connected at one end to said base plate and at its other opposite end to said U-shaped bracket;

said actuator means being comprised of first and second actuators each arranged in a parallel spaced apart side-by-side relationship with one another and being slidably mounted for movement relative to said base plate on said guide means; and control means connected with said actuator means for controllably energizing and de-energizing said actuator means and selectively positioning said rail section adjacent one of said two subsidiary loop positions or in line with said first rail.

19. A method of using a switch for moving a transfer rail between a normal position in which said switch is positioned in line with a first rail and a second position oriented rightmost of said normal position and a third position oriented leftmost of said normal position, said method comprising the steps of:

providing a first actuator having a first member moveable between an extended and a retracted position and directing it in a first direction for attachment to a support;

providing a second actuator having a second member moveable between an extended and a retracted position and directing it in a second direction opposite of said first direction for attachment with said transfer rail;

providing a first valve controllable between an ON and an OFF condition and connecting it with said first actuator, said first valve being connected with said first actuator for controlling the movement of said first moveable member;

providing a second valve controllable between an ON and an OFF condition and connecting it with said second actuator for controlling the movement of said second moveable member; and slidably unitarily mounting said first and said second actuators in a parallel spaced apart side-by-side relationship with one another on guides and moving said transfer rail between said normal position and said positions oriented rightmost and leftmost of it by selectively placing said first and said second valves in either of said ON or OFF conditions.

20. A method as defined in claim 19 further characterized by associating one of said first and second valves with one of said rightmost and leftmost positions and associating the other of said first and second valves with the other of said rightmost and leftmost positions.

21. A method as defined in claim 20 further characterized by positioning said transfer rail in said normal position by maintaining each of said first and said second valves in an OFF condition.

22. A method as defined in claim 20 further characterized by moving said transfer rail initially from said normal position toward one of said rightmost or leftmost positions by placing the one of said first and second valves associated with the position towards which the transfer rail is to be moved in an ON condition while maintaining the other of said first and second valves in an "OFF" condition.

23. A method as defined in claim 22 further characterized by moving said transfer rail from an initial position at one of said rightmost or leftmost positions to a final position at the other of said rightmost or leftmost positions by simultaneously reversing the conditions of said first and second valves.

* * * * *